US012496592B2

(12) United States Patent
Sanchez

(10) Patent No.: US 12,496,592 B2
(45) Date of Patent: Dec. 16, 2025

(54) CENTRIFUGE PROCESSING DEVICE AND METHOD

(71) Applicant: Jorge Armando Sanchez, Chula Vista, CA (US)

(72) Inventor: Jorge Armando Sanchez, Chula Vista, CA (US)

( * ) Notice: Subject to any disclaimer, the term of this patent is extended or adjusted under 35 U.S.C. 154(b) by 482 days.

(21) Appl. No.: 18/110,744

(22) Filed: Feb. 16, 2023

(65) Prior Publication Data

US 2024/0278261 A1 Aug. 22, 2024

(51) Int. Cl.
*B04B 7/16* (2006.01)
*B04B 5/04* (2006.01)

(52) U.S. Cl.
CPC .............. *B04B 7/16* (2013.01); *B04B 5/0407* (2013.01)

(58) Field of Classification Search
CPC .................................................... B04B 5/0414
See application file for complete search history.

(56) References Cited

U.S. PATENT DOCUMENTS 2,025,282 A * 12/1935 Hoffman .................. B04B 7/18
210/380.1

* cited by examiner

*Primary Examiner* — Thuan D Dang
(74) *Attorney, Agent, or Firm* — Donn K. Harms

(57) ABSTRACT

A coaxially assembled material processing assembly configured for engagement with a centrifuge device. The assembly includes a basket having a sidewall and endwall with openings communicating therethrough. The coaxially assembled assembly is positionable within a solid-walled central housing to form a material holding gap between the basket sidewall and central housing. Unwanted processed material sized larger than the openings in the basket are held therein while desired material is moved to the gap between the basket and solid wall of the central housing.

6 Claims, 4 Drawing Sheets

CENTRIFUGE PROCESSING DEVICE AND METHOD

BACKGROUND OF THE INVENTION

1. Field of the Invention

The present invention relates generally to centrifuges employed for processing material such as in a laboratory or product processing setting. More particularly, it relates to a metal container system for conventional centrifuges which is employable to process material at higher forces than conventional containers and without the need for polymer type containers which can negatively interact with the material being processed.

2. Prior Art

A centrifuge is a component that employs a centrifugal force to separate various components of a substance. Such a separation is achieved by spinning the material within the centrifuge at high speed within a container therein. The high speed imparts force upon the material to thereby separate fluids or the like of different densities, such as liquids from solids.

Conventionally, the process works by causing denser substances and particulate to move outward under centrifugal force in a radial direction. Concurrently, materials which are less dense are displaced and held or moved toward a central location. In a laboratory centrifuge, which employs sample tubes, the radial acceleration causes denser particles to move to the bottom of the tube. At the same time, low density substances will move toward or rise to the top of the tube. Such processing by a centrifuge can provide an effective filter which separates contaminants or unwanted components from the main body of the material being processed. Industrial scale centrifuges are conventionally employed in manufacturing and waste processing to cause sedimentation of suspended solids or to cause the separation of immiscible liquids.

In conventional laboratory and similar processing centers, such centrifuge machinery, conventionally, employs polymeric containers which are spun to separate various components of the material so spun. However, the material forming such conventional plastic or polymeric containers is known to interact negatively with some materials, such as terpenes, for example. Further, such polymeric containers are susceptible to cracking or bursting under very high rotation yielding higher centrifugal forces.

The forgoing examples of related art of centrifuges and the limitations related therewith are intended to be illustrative and not exclusive, and they do not imply any limitations on the invention described and claimed herein. Various other limitations in the related art of centrifuges and processing thereby will become apparent to those skilled in the art upon a reading and understanding of the specification below and the accompanying drawings.

SUMMARY OF THE INVENTION

The device herein disclosed and described provides for metallic assemblable components which are employable in the centrifugal processing of solid and liquid materials in a centrifuge. The system herein provides a plurality of preferably metallic components which are assembled to form a material processing assembly which is operatively engaged within a housing container. The exterior of the housing container is sized and configured to operatively engage within the conventional opening of a rotor assembly of a centrifuge. The housing container interior cavity is configured to removably engage and coaxially position the assembled material processing assembly device therein in a fixed coaxial positioning within that housing container interior cavity.

The components coaxially forming the material processing assembly can be manufactured with the appropriate diameters and lengths and attaching components or connections to operatively engage them into existing housing containers used or paired with existing centrifuge devices. Alternatively, the components forming the material processing assembly can be configured for their coaxial engagement and a subsequent positioning within a provided housing container which is adapted to fit within existing openings of existing centrifuges. Alternatively, adapters can be provided to allow for an interface and mounting of a provided housing container with an indented centrifuge.

In all modes of the device and system herein, the material processing assembly includes a basket component. The basket component has a basket sidewall and basket bottom wall defining and surrounding a basket interior cavity. A distal end of the basket sidewall at the end opposite the basket bottom wall, surrounds and defines a basket cavity opening which provides access to the basket interior cavity. Openings or apertures communicate through at least the basket sidewall and, preferably, the basket sidewall and the basket bottom wall.

When coaxially assembled within the basket interior cavity of the material processing assembly is positioned a solid walled central housing. The solid walled central housing is in a removably fixed engagement with the basket component. In this coaxially assembled configuration, the basket sidewall surrounds the solid housing sidewall of the central housing, and the basket bottom wall is spaced from and positioned adjacent the area of a solid basket bottom wall. So assembled, a material holding gap is formed between the solid housing sidewall of the central housing and the perforated basket sidewall. This material holding gap may continue around to a secondary holding area for the processed material which is positioned between the basket bottom wall of the basket component and the housing bottom wall of the central housing.

With the material processing assembly providing for the solid walled central housing to be removably fixed coaxially within a basket component and then coaxially assembled, a high degree of easy customization of the device and system to the material being processed is provided. To that end, a plurality of basket components may be provided in a kit of basket components where each basket component in the kit has a different diameter of the openings communicating through the basket sidewall and basket bottom wall. This chooseable opening diameter allows the user to choose the basket container having the appropriate sized openings for the intended material to be processed and to then coaxially mate it to a fixed position where the basket sidewall and basket bottom wall are both spaced from and surround the solid housing sidewall and solid housing bottom wall. Larger openings may be desirable for some thicker semi-solid or solid material whereas smaller openings may be appropriate for other chosen materials to process.

In another customization to the anticipated material to be processed, the basket components in the kit thereof may have a basket sidewall that varies in a length of projection from the distal edge of the basket sidewall to the basket bottom wall. A shorter basket sidewall will, thus, position the basket endwall further from the housing solid endwall and thereby increase the size of the secondary holding area. Conversely, a basket having a longer sidewall will position the basket endwall closer to the housing endwall and form a smaller or secondary area should they touch.

The varying of the sidewall length of the basket sidewall can also be chosen to increase or decrease a processed material collection area formed between the basket bottom wall and the bottom of the interior of the housing container. A longer basket sidewall will decrease this material collection area, since it will position the basket endwall closer to a bottom surface of the interior of the housing container. Conversely, a shorter basket sidewall will increase this collection area at the bottom of the interior of the housing container.

Further, a varying of the diameter of the assembled basket component and central housing can increase and decrease the surrounding processed material collection area in between the interior sidewall of the housing container and the exterior of the basket sidewall. As such, the basket components, which are assemblable coaxially with the central housing to form the material processing assembly herein, can be provided in varying diameters of the open ends thereof such that material processing assemblies may vary in size by diameter to increase or decrease the surrounding processed material collection area when operatively engaged within the interior chamber of the housing container.

In all modes of the device and system herein, a first removable connection between the basket component and the central housing which it surrounds is provided which will maintain the coaxial engagement of the two during high speed rotation. Such a first removable connection may be threaded engagement, circumferential engagements of the interior of the distal edge of the basket sidewall with the exterior of the housing sidewall, or other engagements as would occur to those in the art.

Currently, however, an especially preferred first removable connection is a contact of a first flange extending from the distal edge of the basket sidewall with a second flange extending from the housing sidewall. During assembly, the second flange will be positioned atop the first flange. Concurrently, a substantially equal circumferential interior sidewall, at the opening to the basket interior cavity, will contact with the exterior circumferential surface at the distal end of the central housing sidewall.

Thereafter, with the two forming the material precessing assembly, it may be positioned into the interior chamber of the housing container where a ledge running around the interior surface adjacent the opening to this interior chamber will contact against the lower surface of the first flange extending from the basket component. A lid is then secured and holds both the first ledge and second ledge in a compressed sandwiched engagement between a lower surface of the lid and the ledge, in a mounted position within the housing container interior chamber. Such allows for easy assembly, insertion, and removal of differently configured material processing assemblies.

With the material processing assembly in this mounted position, the processed material collection area is formed between the exterior surface of the basket sidewall and basket bottom wall and the interior sidewall surface and the bottom wall surface of the interior chamber. This processed material holding area will receive the material which communicates from the material holding area and through the openings in the basket sidewall. As noted, the volume of this processed material collection area can vary with the customization of the formed material processing assembly by the user in the above noted manner.

With the material processing assembly coaxially assembled and in the mounted position within the interior chamber, the housing container is positioned into the holder therefor of the centrifuge which is then energized to spin. The material processed in this manner can vary from a substantially solid material, such as an herb or spice or other plant, to a more solid material, such as nuts or the like.

For example, and to be considered in no way limiting, when employed with hemp as the material to be processed, such is placed within the material holding area in the gap between the basket sidewall and the housing solid sidewall. When the material processing assembly is rotated by the spinning rotor, the secondary portion of the material being processed, such as liquid CBD, will be separated from the first portion of the material within the material holding gap during rotation. In this mode of operation, a basket from the plurality is chosen which has openings in the basket sidewall, which will only pass the second portion of the material or CBD liquid, and will not pass the first material portion which remains in the material holding gap. The size of the openings will prevent passage of the unwanted remainder of the first portion of the material.

As noted, the size and diameter of the coaxially assembled material processing assembly may be dimensioned for use in combination with existing centrifuges with existing housing containers which hold material and engage within openings in the rotor. Alternatively, the material processing assembly herein can be provided with a container specifically dimensioned to hold it and then mount with the rotor of a centrifuge.

As noted, metal containers and metal baskets are preferred herein since they will maintain structural integrity under extremely high centrifugal forces which may rupture polymeric or other containers of lessened structural integrity. However, if a polymeric or plastic or ceramic container may be formed which will maintain such structural integrity at high speeds, such is envisioned within the scope of this patent application. The material forming the basket container and the coaxially positioned central housing must also be inert when placed in communication with the material to be processed.

The centrifuge container system herein can have, as noted, a plurality of baskets in a kit thereof wherein each member of the basket kit has openings communicating through the basket sidewall of a differing diameter. For example, the size of the openings may vary in a range between 5-50 microns where each basket in the plurality will have equal sized openings through the basket sidewall having a diameter thereof in that range. Such allows the user to choose the basket with openings of the appropriate diameter which will pass the liquid material therethrough but hold the material being processed within the basket interior cavity which has a size which will not pass through the openings.

Because the metal containers and baskets will operate under very high rotational forces yielding very high centrifugal force, the volume within the material holding gap of the assembly and the processed material holding area can be much higher than conventional containers used in centrifuges. Such allows for larger amounts of material being processed to be placed in each material holding gap of the material processing assembly to thereby speed up processing of material to yield harvesting of the desired first portion of the processed material which passes through the openings in the sidewall and bottom wall of the chosen basket. Where materials, such as hemp or agriculture products, are processed to yield CBD oil or, for example, essential oils, the ability of the container system herein to process larger amounts of agriculture products placed within the container assembly is a significant advance allowing for widespread use to process such materials commercially.

As used herein and in the claims to describe the various inventive aspects and embodiments, “comprising” means including, but not limited to, whatever follows the word “comprising”. Thus, use of the term “comprising” indicates that the listed elements are required or mandatory, but that other elements are optional and may or may not be present. By “consisting of” is meant including, and limited to, whatever follows the phrase “consisting of”. Thus, the phrase “consisting of” indicates that the listed elements are required or mandatory, and that no other elements may be present. By “consisting essentially of” is meant including any elements listed after the phrase, and limited to other elements that do not interfere with or contribute to the activity or action specified in the disclosure for the listed elements. Thus, the phrase “consisting essentially of” indicates that the listed elements are required or mandatory, but that other elements are optional and may or may not be present depending upon whether or not they affect the activity or action of the listed elements. Where used herein, if not otherwise respectively defined, the term “substantially” alone or in combination with another term of measurement or volume means plus or minus five percent.

With respect to the above description, before explaining at least one preferred embodiment of the herein disclosed material processing assembly system invention in detail, it is to be understood that the container system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based, may readily be utilized as a basis for designing of other centrifuge container structures, methods and systems, for carrying out the several purposes of the present disclosed material processing assembly for a centrifuge herein. It is important, therefore, that the claims be regarded as including such equivalent construction and methodology insofar as they do not depart from the spirit and scope of the present invention.

It is an object of this invention to provide a material processing assembly system for operative engagement within centrifuges which will hold chosen materials to be processed within a material holding gap between a perforated basket sidewall which surrounds a solid sidewall of a central housing which operatively engages with the rotor of a centrifuge.

It is a further object of this invention to provide such a container assembly which includes a plurality of container baskets wherein each basket has different sized but substantially equal sized openings communicating through the basket sidewall to allow harvesting of different first or processed portions of material.

It is an additional object of this invention to provide a device and method having such material processing assemblies wherein the user can choose the basket having the appropriate sized openings in the sidewall thereof to allow the desired first portion of the material to separate from the held material and to pass therethrough, while retaining the remaining portion of the material being processed within the material holding gap.

Further objects, features, and advantages of the present invention, as well as the advantages thereof over existing prior art, which will become apparent from the description to follow, are accomplished by the improvements described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed material processing assembly system for positioning within housing containers mounted in centrifuges herein. It is intended that the embodiments and figures herein are to be considered illustrative of the centrifuge container system invention shown and described system herein, rather than limiting.

In the drawings:

FIG. 1 depicts a front perspective view of the coaxially assembled components of the device herein showing the solid walled central housing having a diameter defined by a solid housing sidewall allowing for coaxial positioning thereof within a basket interior cavity of the depicted basket.

FIG. 2 shows an example of the device as in FIG. 1 but depicting the different sizes in which the central housing with the solid sidewall can be coaxially positioned within the basket interior cavity defined by the basket sidewall FIG. 3 shows an exploded view showing the central housing having a solid sidewall sized for coaxial positioning within the basket interior cavity surrounded by the basket sidewall to form the material processing assembly which is coaxially positioned in a removable mount within the interior chamber of a housing container for a centrifuge.

Figure 1:
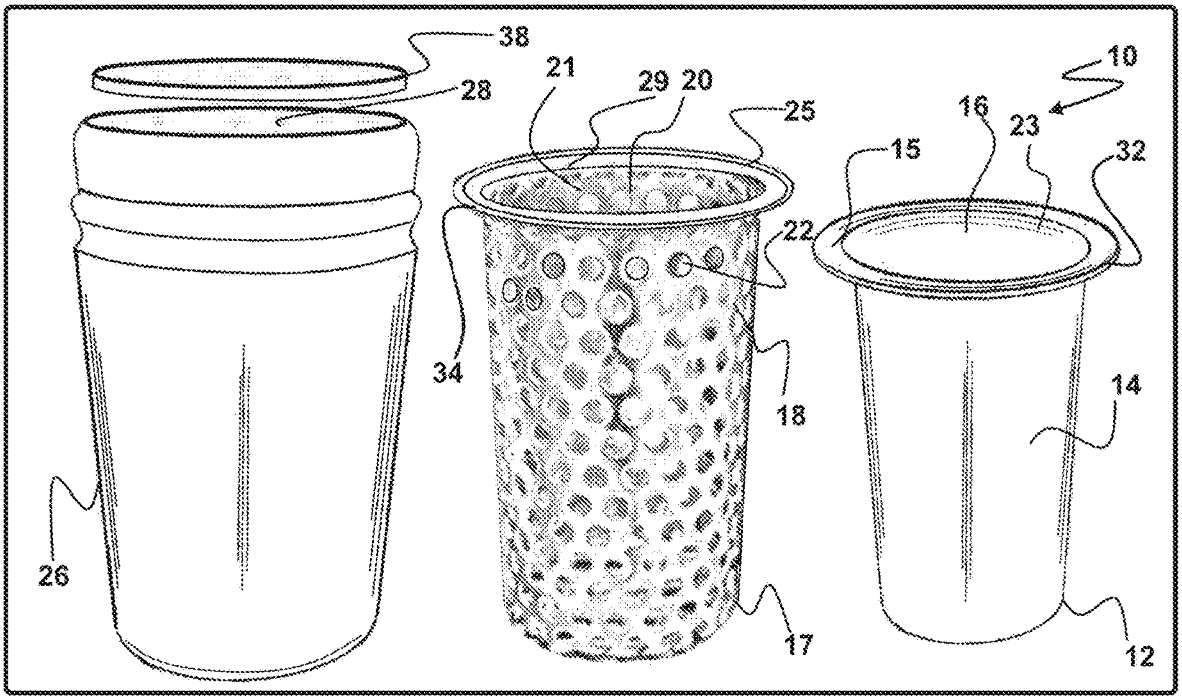

Other aspects of the present container system for material processing in a centrifuge shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 2:
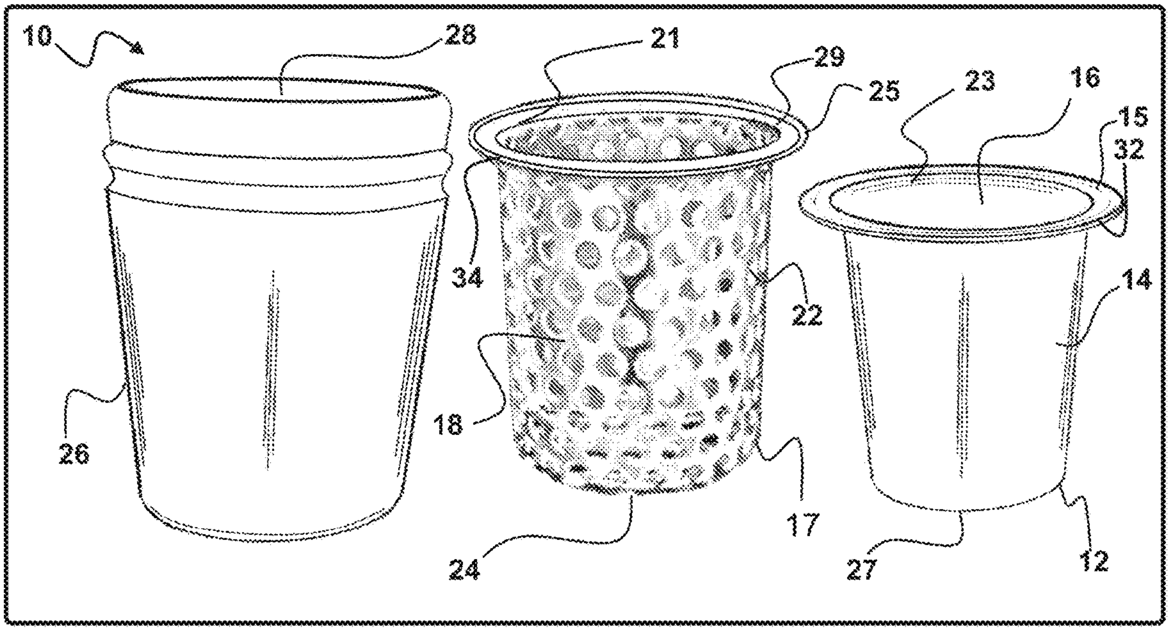
Figure 3:
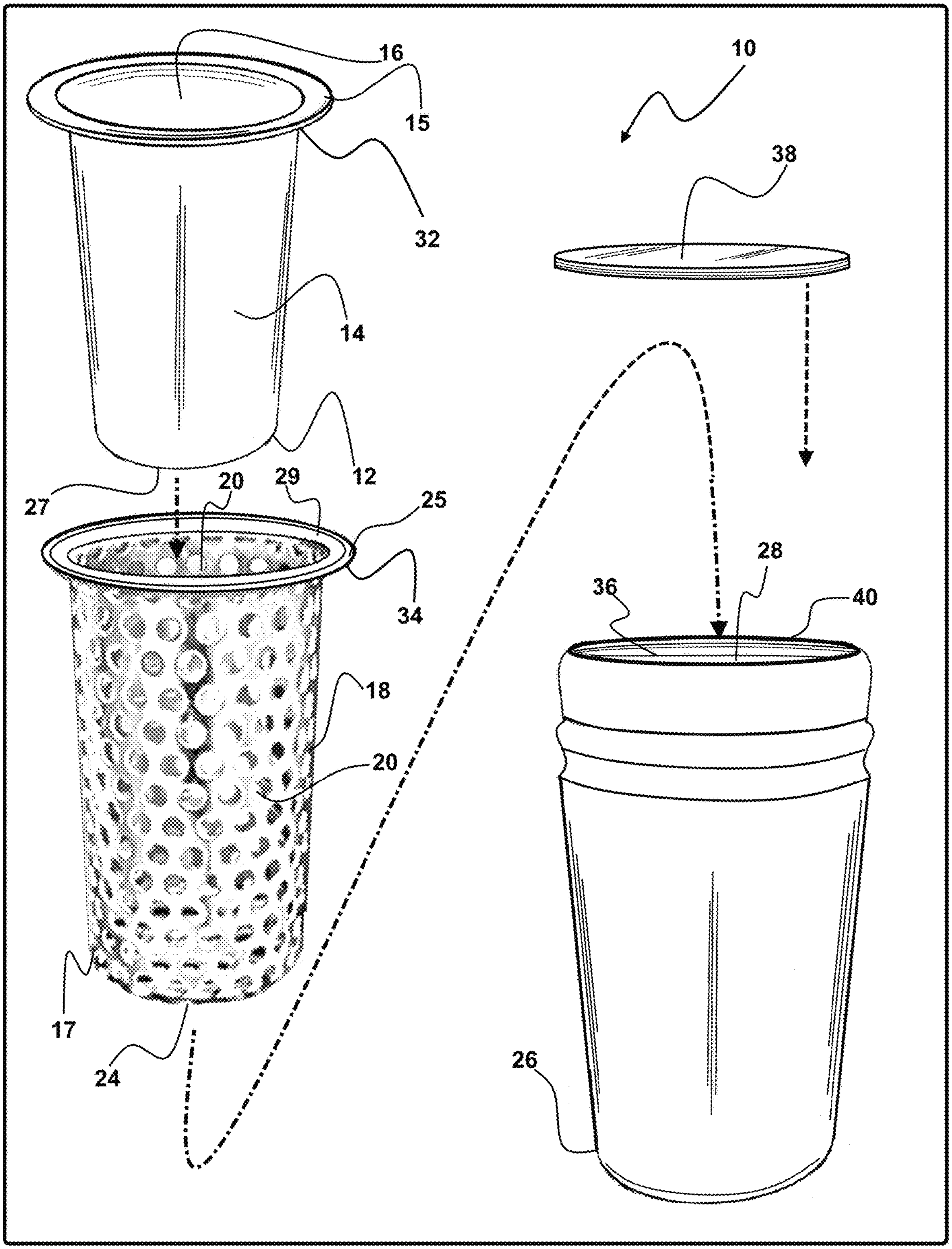
Figure 4:
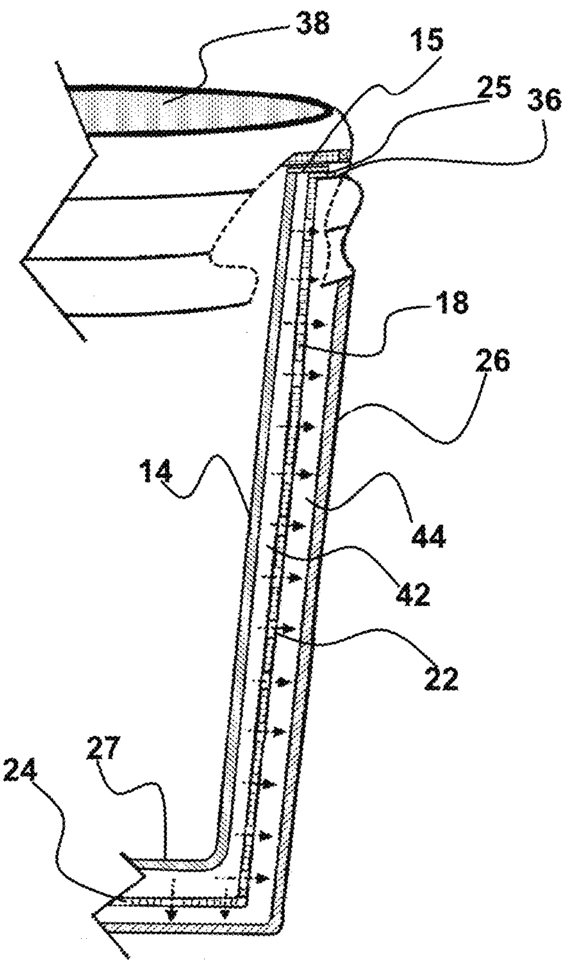
FIG. 4 shows a sectional view through the coaxially aligned components of the material processing assembly in its mount within the interior chamber of the housing container and depicting the material holding area between the basket sidewall surrounding the solid central housing sidewall and the secondary holding area between the bottom wall of the central housing and the bottom wall of the basket.

Now referring to drawings in FIGS. 1-6, wherein similar components are identified by like reference numerals, there can be seen in FIG. 1, a front perspective view of the coaxially assembled components of the material processing assembly device 10 and system herein which is shown in assembled form in FIG. 4.

The components of the device 10 are shown disassembled in FIGS. 1 and 2. As shown in FIG. 1, a central housing 12 is formed with a solid housing sidewall 14 which surrounds a housing interior cavity 16. The housing sidewall 14, at a lower end, is engaged with a housing bottom wall 27 (FIG. 4) which is also of solid construction in the same manner as the housing sidewall 14. At a top end of the housing sidewall 14 is defined an opening to the housing interior cavity 16. Also, at the top end of the housing sidewall 14 is positioned a housing flange 15 which extends from the housing sidewall 14 in a direction away from the formed housing opening 23 which it surrounds. This construction is preferred in all modes of the device 10.

Also shown is the basket 17 which, as noted, is preferably formed of a metal, such as stainless steel. The basket 17 has a basket sidewall 18. The basket sidewall 18 surrounds and defines a basket interior cavity 20. Communicating through the basket sidewall 18 are a plurality of openings 22 which communicate with the basket interior cavity 20. A basket bottom wall 24 (FIG. 4) is positioned at the bottom of the basket interior cavity 20 and at the lower end of the basket sidewall 18. The basket bottom wall 24 may also have a plurality of openings 22 formed therein which communicate with the basket interior cavity 20.

The basket 17 has a basket opening 21 formed at a top end of the basket sidewall 18 opposite the basket bottom wall 24. This basket opening 21 communicates with the basket interior cavity 20. Also positioned in an engagement to the top of the basket sidewall 18 surrounding the basket opening 21 is a basket flange 25. The basket flange 25 extends from the basket sidewall 18 in a direction away from the basket opening 21 which communicates with the basket interior cavity 20.

In all modes of the device 10 system herein, the housing sidewall 14 defines an exterior circumference of the central housing 12. This circumference of the body of the central housing 12, in all modes of the device 10 and system herein, is configured to allow positioning of the central housing 12 within the basket interior cavity 20 in a coaxial engagement therein rendering the central housing 12 in a concentric removable engagement with the basket 17. Consequently, a center axis of the central housing 12 running through the central housing interior cavity 18 substantially aligns with the center axis of the basket 17 running through the basket interior cavity 20.

Figure 6:
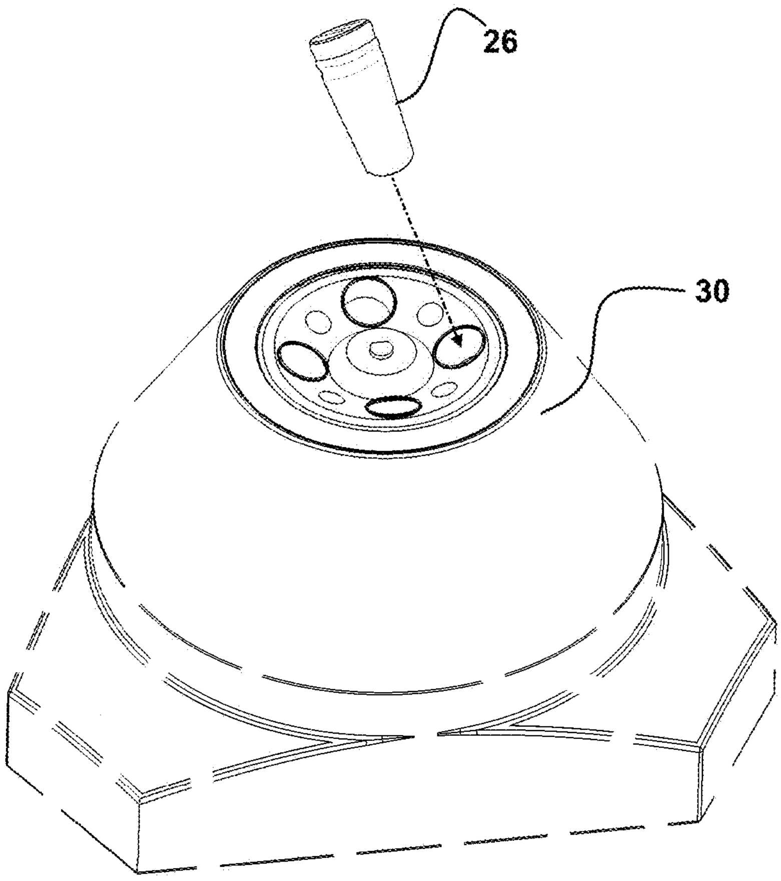
FIG. 6 depicts a view of one type of conventional centrifuge having recesses formed into a rotor thereof which are configured to securely hold the housing container housing therein.

Also shown in FIGS. 1-2 are a housing container 26 which has a housing cavity 28. The housing container 26 may be included as part of the device 10 and system herein, or, the material processing assembly, which is formed by the coaxially engaging central housing 12 and basket 17, can be provided for operative engagement within existing housing containers 26 which are employed with existing centrifuges 30 (FIG. 6). By operative engagement is meant that the assembled material processing assembly formed by the central housing 12 positioned within the basket 17 is held in a removable engagement within the housing container housing cavity 28, wherein they are coaxially aligned therein with each other.

In FIG. 3 shows an exploded view of the device 10 herein and the manner of engagement of the material processing assembly formed by the central housing 12 engaged within the basket interior cavity 20 of the basket 17. In a first step forming a processing assembly, the central housing 12 is positioned into the basket interior cavity 20 through the open end of the basket 17 which is surrounded by the basket flange 25. During this formation of the material processing assembly, the housing flange 15 will contact against the basket flange 25 and when inserted into the housing cavity 28 of the housing container 26. Pressure from the engagement of the lid 38 into the opening 40 of the housing container 26 will hold impart pressure to the housing flange 15 against the basket flange 25 to hold the central housing 12 in a coaxial or concentric positioning within the basket interior cavity 20 with the housing sidewall 14 positioned across a gap from the basket sidewall 18, as shown in FIG. 4.

This concentric positioning can be held by this pressure or in a number of ways however in a particularly preferred manner which experimentation has shown to be much more stable, the exterior circumference 32 of the housing flange 15 is formed substantially equal to the exterior circumference 34 of the basket flange 25. A ledge 36 formed into the open end of the housing container 26 will have a sidewall 37 surface having a substantially equal circumference whereby the surface of that sidewall contacts both the exterior circumference 34 of both the basket flange 25 and the exterior circumference 32 of the housing flange 15. This contact was shown in experimentation to be superior in holding the central housing 12 coaxially aligned within the basket interior cavity 20 with the axes of both substantially coaxially aligned.

Alternatively, a recessed area 29 in the basket flange 25 can be formed to allow the housing flange 15 to settle therein with the housing axis of the central housing 16 aligned with the basket axis running through the basket interior cavity 20. Pressure from the lid 38 when operatively engaged into the opening 40 will hold the housing flange 15 within the recessed area 29, and maintain the coaxial positioning. As noted the lid 38 engagement may be with mating connectors such as threads on the lid 38 and opening 40 or frictional engagement or other engagements which will be maintained during use.

Once the material processing assembly formed by the central housing 12 positioned concentrically within the basket 17 is formed, it is inserted into the interior of the housing cavity 28 of the housing container 26. A lid 38 is engaged to the opening 40 which, once engaged, as in FIG. 4, will hold the processing assembly operatively positioned within the housing cavity 28 of the housing container 26. The lid 38 may have threads to engage with mating threads in the opening 40, or may have a frictional engagement therein, or may have other removable connections therebetween.

As noted, shown in FIG. 4, is the device 10 herein showing a sectional view which depicts the material processing assembly formed by the engaged central housing 12 positioned within the basket interior cavity 20. In the concentric positioning material, a first gap 42 is formed between the housing sidewall 14 and the basket sidewall 18. This first gap 42 may extend around to the area between the bottom wall 27 of the central housing 12 and the basket bottom wall 24 depending on the overall length of the housing sidewall 14 relative to that of the basket sidewall 18. This first gap 42 provides an area for positioning of material to be processed by the material processing assembly during rotation of the centrifuge.

In FIG. 4 is also shown a second gap 44 which provides a reservoir or catch area for processed material from the material to be processed, which communicates from the first gap 42 area through the openings 22 and into the second gap 44. This second gap 44 is defined by the area between the basket sidewall 18 and the interior surface 46 defining the housing container housing cavity 28. The material being processed is such that it has particles of the processed material portion thereof sized to communicate through the diameter of the openings 22 of the size chosen by the user, while leaving a remaining portion of the material being processed within the first gap 42. As noted, the user will choose the basket 17 having openings 22 therein of a diameter which will allow passage of the processed material therethrough, while preventing the remaining portion of the material being processed from such communication and keeping it within the first gap 42 area.

Figure 5:
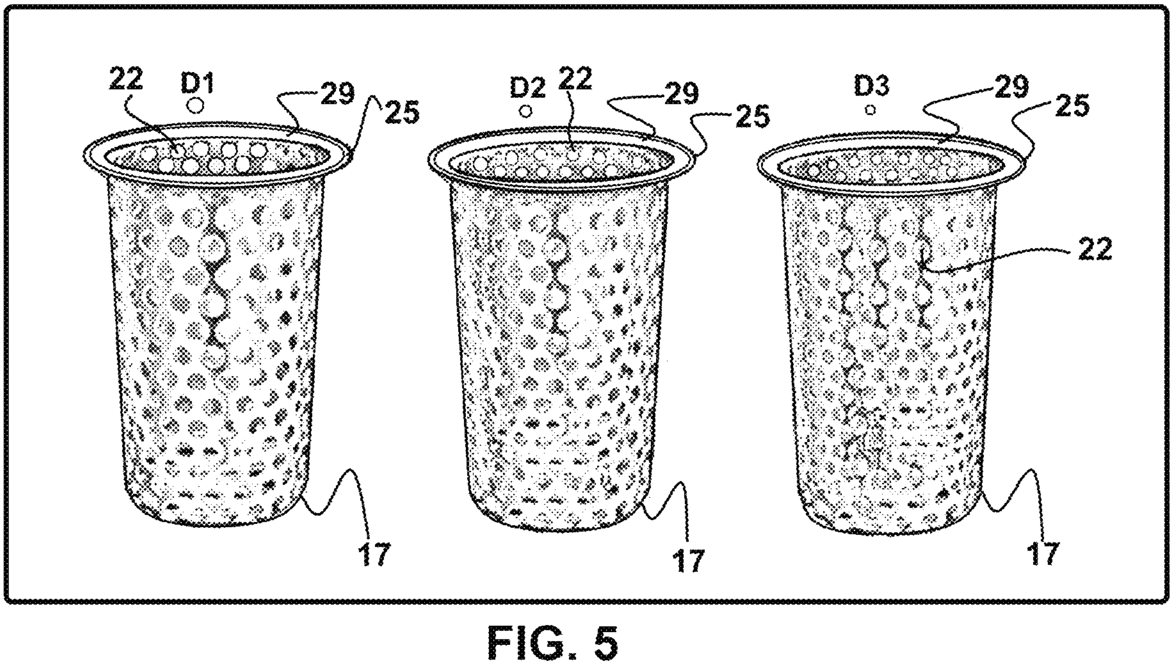
FIG. 5 shows a plurality of baskets where each has substantially equal sized openings formed in the basket sidewall which are sized in diameter to pass differing first portions of material being processed therethrough while blocking passage of remainder material which is left in the material holding gap.

The width or size of the first gap 42, which is the distance between the housing sidewall 14 and the basket sidewall 18, may vary. Such is accomplished by varying one or both of the circumference of the housing sidewall 14 surrounding the housing interior cavity 16 and the circumference of the basket sidewall 18 surrounding the basket interior cavity 20.

Where provided as a kit of baskets 17, as in FIG. 5, the size of the openings 20, shown as D1, is the largest opening, D2 a smaller opening than D1, and D3 a smaller opening then D2, may vary to allow the user to choose the diameter of the openings 20 needed to process a material of choice and pass the processed material portion to the second gap 44. In such a kit, the circumferential distance around the basket sidewall 18 may vary also along with the size of the openings, to render the first gap 42 smaller or the second gap 44 larger.

Finally, shown in FIG. 6, is a depiction of a housing container 26 having the material processing assembly formed by the engaged central housing 12 coaxially positioned within the basket interior cavity 20 of a basket 17, being located into a centrifuge 30 for processing. Subsequent to the employment of the centrifuge 30, the housing container 26 may be removed, and the material processing assembly may be removed therefrom, and the processed material will remain within the interior of the housing container housing cavity 28 for removal by the user.

While all of the fundamental characteristics and features of the centrifuge engageable material precessing invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A centrifuge processing apparatus comprising:

a central housing, said central housing having a housing opening communicating with a housing interior cavity, said housing interior cavity defined by a housing sidewall of said central housing extending to a housing endwall;

said housing sidewall and said housing endwall both being formed of solid material;

a housing flange engaged to said housing sidewall at a position surrounding said housing opening;

a basket, said basket having a basket opening communicating with a basket interior cavity, said basket interior cavity defined by a basket sidewall which extends to a basket endwall;

said basket sidewall having openings communicating therethrough, said openings being substantially equal in size;

a basket flange engaged to said basket sidewall at a position surrounding said basket opening;

said central housing positionable within said basket interior cavity in a coaxial alignment therewith to form a processing assembly;

said processing assembly having a first gap area formed between said housing sidewall and said basket sidewall, said first gap for holding material being processed therein;

said processing assembly insertable into a container cavity of a housing container, said container cavity defined by a housing container sidewall, said housing container configured for insertion into a centrifuge;

positioning of said processing assembly within said container cavity forming a second gap between said basket sidewall and said housing container sidewall; and said second gap defining a reservoir for processed material which communicates through said openings during operation of said centrifuge, whereby said processed material is separable from said material to be processed.

2. The centrifuge processing apparatus of claim 1 additionally comprising:

an annular recessed area formed into said basket flange; and said housing flange positionable into said recessed area, whereby said central housing is held in said coaxial alignment with said basket by said housing flange positioned within said recessed area.

3. The centrifuge processing apparatus of claim 1 additionally comprising:

said housing flange having a circumferential edge thereof which is substantially equal to a circumferential edge of said basket flange;

a ledge surrounding an opening communicating with said container cavity;

said ledge extending from a circumferential interior surface of said housing container sidewall; and said circumferential interior surface having a circumference thereof which is substantially equal to a circumference of said circumferential edge of said basket flange.

4. The centrifuge processing apparatus of claim 1 additionally comprising:

said basket being one from a kit of individual baskets; and each of said individual baskets in said kit having openings therein which are of a differing substantially equal size.

5. The centrifuge processing apparatus of claim 2 additionally comprising:

said basket being one from a kit of individual baskets; and each of said individual baskets in said kit having openings therein which are of a differing substantially equal size.

6. The centrifuge processing apparatus of claim 3 additionally comprising:

said basket being one from a kit of individual baskets; and each of said individual baskets in said kit having openings therein which are of a differing substantially equal size.

* * * * *